(12) United States Patent
Carbonelli (10) Patent No.: US 8,585,335 B2
(45) Date of Patent: Nov. 19, 2013

(54) ANCHOR BOLT INSTALLATION SYSTEM (76) Inventor: Alessandro Carbonelli, Rome (IT)

( * ) Notice: Subject to any disclaimer, the term of this patent is extended or adjusted under 35 U.S.C. 154(b) by 375 days.

(21) Appl. No.: 12/961,071

(22) Filed: Dec. 6, 2010

(65) Prior Publication Data
US 2011/0135419 A1    Jun. 9, 2011

Related U.S. Application Data (60) Provisional application No. 61/267,476, filed on Dec. 8, 2009.

(51) Int. Cl.
*F16B 39/02*    (2006.01)

(52) U.S. Cl.
USPC ............ 411/82; 405/259.6; 206/219; 52/704

(58) Field of Classification Search
USPC ................. 411/82, 82.3; 206/219; 52/704; 405/259.5, 259.6; 428/321.5
See application file for complete search history.

(56) References Cited

U.S. PATENT DOCUMENTS

| | | | |
|---|---|---|---|
| 3,722,671 A * | 3/1973 | Wright et al. ................ | 206/338 |
| 3,915,297 A | 10/1975 | Rausch | |
| 4,023,373 A | 5/1977 | Hipkins | |
| 4,124,983 A * | 11/1978 | Weatherby ................ | 405/259.5 |
| 4,187,040 A * | 2/1980 | Donan, Jr. ................ | 405/259.3 |
| 4,253,566 A | 3/1981 | Seemann | |
| 4,263,832 A | 4/1981 | Lang | |
| 4,279,340 A | 7/1981 | Lang | |
| 4,372,708 A | 2/1983 | Bower, Jr. | |
| 4,378,997 A | 4/1983 | Kasama | |
| 4,404,875 A | 9/1983 | Sadanandan | |
| 4,497,403 A * | 2/1985 | Rausch ................ | 206/219 |
| 4,528,792 A * | 7/1985 | Cross et al. ................ | 52/704 |
| 4,652,193 A | 3/1987 | Hibbs | |
| 4,729,696 A | 3/1988 | Goto | |
| 4,894,269 A | 1/1990 | Kimura | |
| 5,069,336 A | 12/1991 | Mauthe | |
| 5,104,266 A | 4/1992 | Daryoush | |
| 5,263,804 A | 11/1993 | Ernst | |
| 5,282,697 A * | 2/1994 | Maechtle ................ | 405/259.6 |
| RE35,276 E * | 6/1996 | Chan ................ | 366/139 |
| 5,544,981 A | 8/1996 | Nishida | |
| 5,632,839 A * | 5/1997 | Kish et al. ................ | 156/194 |
| 5,643,994 A | 7/1997 | Kish | |
| 5,785,462 A | 7/1998 | Hein | |
| 5,953,879 A | 9/1999 | Fischer | |
| 6,402,434 B1 | 6/2002 | Surjan | |
| 6,416,256 B1 * | 7/2002 | Surjan et al. ................ | 405/259.5 |
| 6,598,499 B1 | 7/2003 | Ernst | |

(Continued)

*Primary Examiner* — Gary Estremsky
(74) *Attorney, Agent, or Firm* — Jason L. Gilbert (57) ABSTRACT

An anchor bolt installation system comprised of a single-use capsule containing a mono-component anchoring substance for anchoring fastening articles to walls or similar structures. The present invention generally includes an open-ended capsule containing a plurality of apertures formed in an outer wall thereof. A mono-component anchoring substance is placed within a cavity in the capsule. A sleeve is positioned around the capsule and a cap is positioned to cover the opening of the capsule to prevent premature hardening of the anchoring substance. A guide member may be positioned within the opening of the capsule to guide and center a fastener being inserted therein. After removing the outer sleeve and cap, the capsule may be placed within a borehole. A fastener may then be inserted within the capsule, causing the anchoring substance to be excreted through the apertures of the capsule to firmly secure the capsule and bolt within the wall.

9 Claims, 8 Drawing Sheets

(56) References Cited

U.S. PATENT DOCUMENTS

| | | | |
|---|---|---|---|
| 6,868,597 B2 * | 3/2005 | Stevenson et al. ............. 29/460 |
| 7,368,170 B2 | 5/2008 | Liu |
| 2008/0047223 A1 | 2/2008 | Suehiro |
| 2011/0186450 A1 * | 8/2011 | Bonacci ........................ 206/219 |

* cited by examiner

ANCHOR BOLT INSTALLATION SYSTEM

CROSS REFERENCE TO RELATED APPLICATIONS

I hereby claim benefit under Title 35, United States Code, Section 119(e) of U.S. provisional patent application Ser. No. 61/267,476 filed Dec. 8, 2009. The 61/267,476 application is currently pending. The 61/267,476 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a system for anchoring bolts and more specifically it relates to an anchor bolt installation system comprised of a single-use capsule containing a mono-component anchoring substance for anchoring fastening articles to walls or similar structures.

2. Description of the Related Art

Any discussion of the related art throughout the specification should in no way be considered as an admission that such related art is widely known or forms part of common general knowledge in the field.

Wall anchors have been in use for years. Wall anchors are generally utilized to provide a receptacle to which a fastener such as a bolt or screw may be attached to retain a load. Previously existing wall anchors have generally been comprised of anchor screws which are inserted into a wall and then used as an anchor for additional fasteners. However, such anchor screws are often installed in such a way that allows the anchor or fastener to wiggle or loosen over time, thus compromising the integrity of the anchoring system and creating a risk that the load will become dislodged and fall away from the wall.

Anchoring systems have been introduced which utilize adhesive components within a wall anchor. However, these anchoring systems, such as the capsule disclosed in U.S. Pat. No. 5,104,266, have used multiple components which, when manually mixed, form an adhesive compound. These systems require that the installer properly mix the multiple components to form the compound, and failure to do so can compromise the integrity of the anchor. Additionally, the requirement of mixing multiple components can often create a mess for the individual installing the anchor and, in some cases, requires the use of specialized tools which would not otherwise be needed for installing an anchor within a wall or other structure.

Because of the inherent problems with the related art, there is a need for a new and improved anchor bolt installation system comprised of a single-use capsule containing a mono-component anchoring substance for anchoring fastening articles to walls or similar structures.

BRIEF SUMMARY OF THE INVENTION

A system comprised of a single-use capsule containing a mono-component anchoring substance for anchoring fastening articles to walls or similar structures. The invention generally relates to an anchoring system which includes an open-ended capsule containing a plurality of apertures formed in an outer wall thereof. A mono-component anchoring substance is placed within a cavity in the capsule. A sleeve is positioned around the outer surface of the capsule and a cap is positioned to cover the opening of the capsule to prevent premature hardening of the anchoring substance. A guide member may be positioned within the opening of the capsule to guide and center a fastener being inserted therein. After removing the outer sleeve and cap, the capsule may be placed within a borehole of a wall. A fastener may then be inserted within the capsule, causing the anchoring substance to be excreted through the apertures of the capsule to firmly secure the capsule and bolt within the wall.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 10 illustrate an anchor bolt installation system 10, which comprises an open-ended capsule 20 containing a plurality of apertures 26 formed in the outer wall thereof. A mono-component anchoring substance 30 is placed within a cavity 25 in the capsule 20. A sleeve 40 is positioned around the outer surface of the capsule 20 and a cap 60 is positioned to cover the opening 22 of the capsule 20 to prevent premature hardening of the anchoring substance 30. A guide member 50 may be positioned within the opening 22 of the capsule 20 to guide and center a fastener 15 being inserted therein. After removing the outer sleeve 40 and cap 60, the capsule 20 may be placed within a borehole 14 of a wall 13. A fastener 15 may then be inserted within the capsule 20, causing the anchoring substance 30 to be excreted through the apertures 26 of the capsule 20 to firmly secure the capsule 20 and fastener 15 within the wall 13.

B. Capsule

Figure 1:
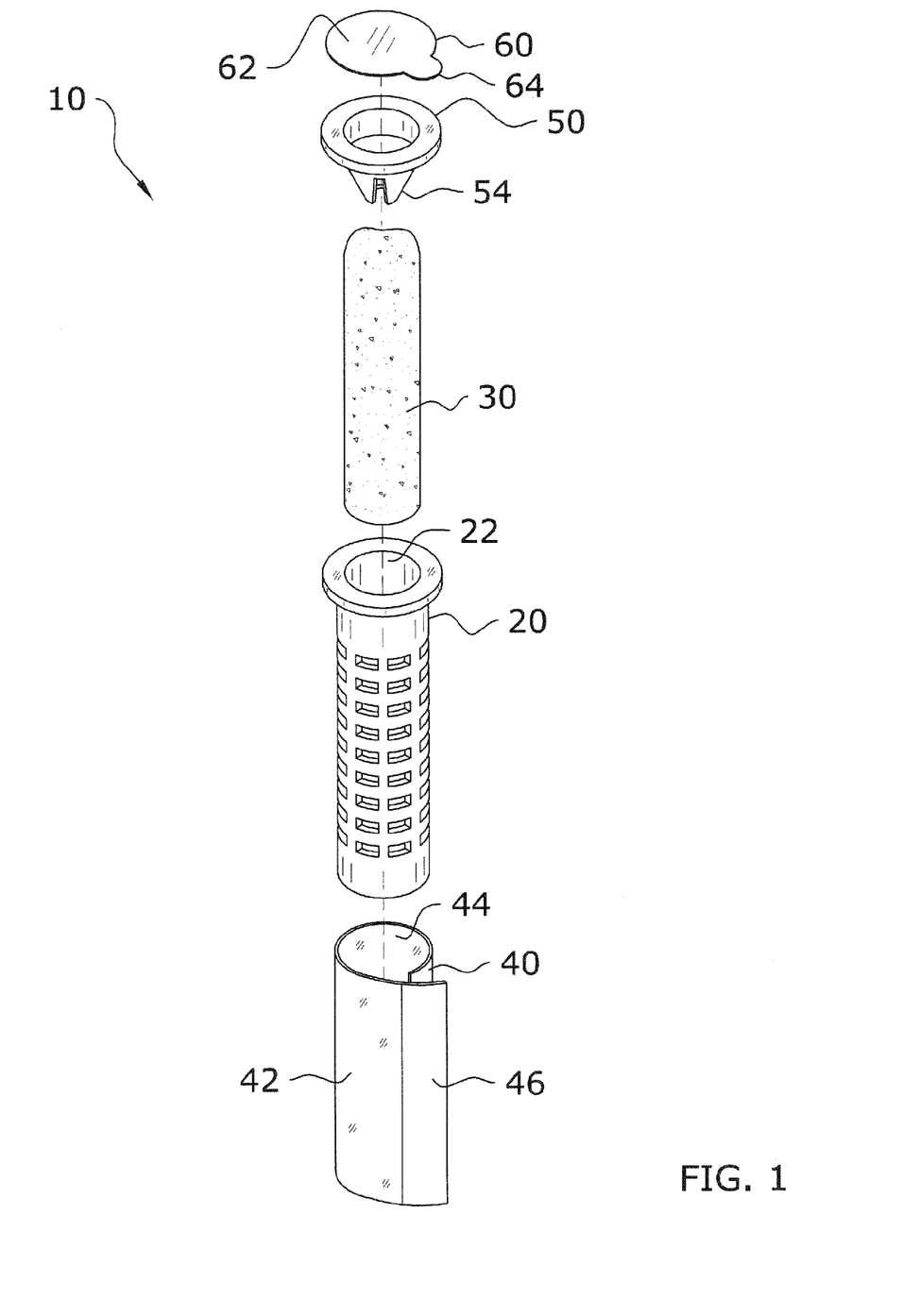
FIG. 1 is an exploded upper perspective view of the present invention.

As shown in FIG. 1, the present invention will generally include a capsule 20 which may be inserted within a borehole 14 of a wall 13 or other structure to act as an anchor. The capsule 20 will generally be comprised of a cylindrically-shaped housing having an open first end 21 and a closed second end 24. However, it is appreciated by one of skill in the art that the capsule 20 may be comprised of various other shapes and is not limited to the circular cross-section shown in the figures. For example and without limitation, the capsule 20 could utilize a polygonal, triangular or square-shaped cross-section in certain embodiments. The capsule 20 may be comprised of various sizes and the ratio with respect to its length and width may vary to accommodate different applications. The capsule 20 may also be comprised of various materials, including plastics, metals, metal alloys and the like.

The first end 21 of the capsule 20 will generally include an opening 22 through which a fastener 15 may be inserted. A cavity 25 will preferably be present within the capsule 20 extending from its first end 21 to its second end 24. A flange 23 may also be included at the open first end 21 of the capsule 20 to provide additional structural support and guidance when the present invention is in use. The flange 23 will also prevent the capsule 20 from being inserted fully within the borehole 14.

Figure 2:
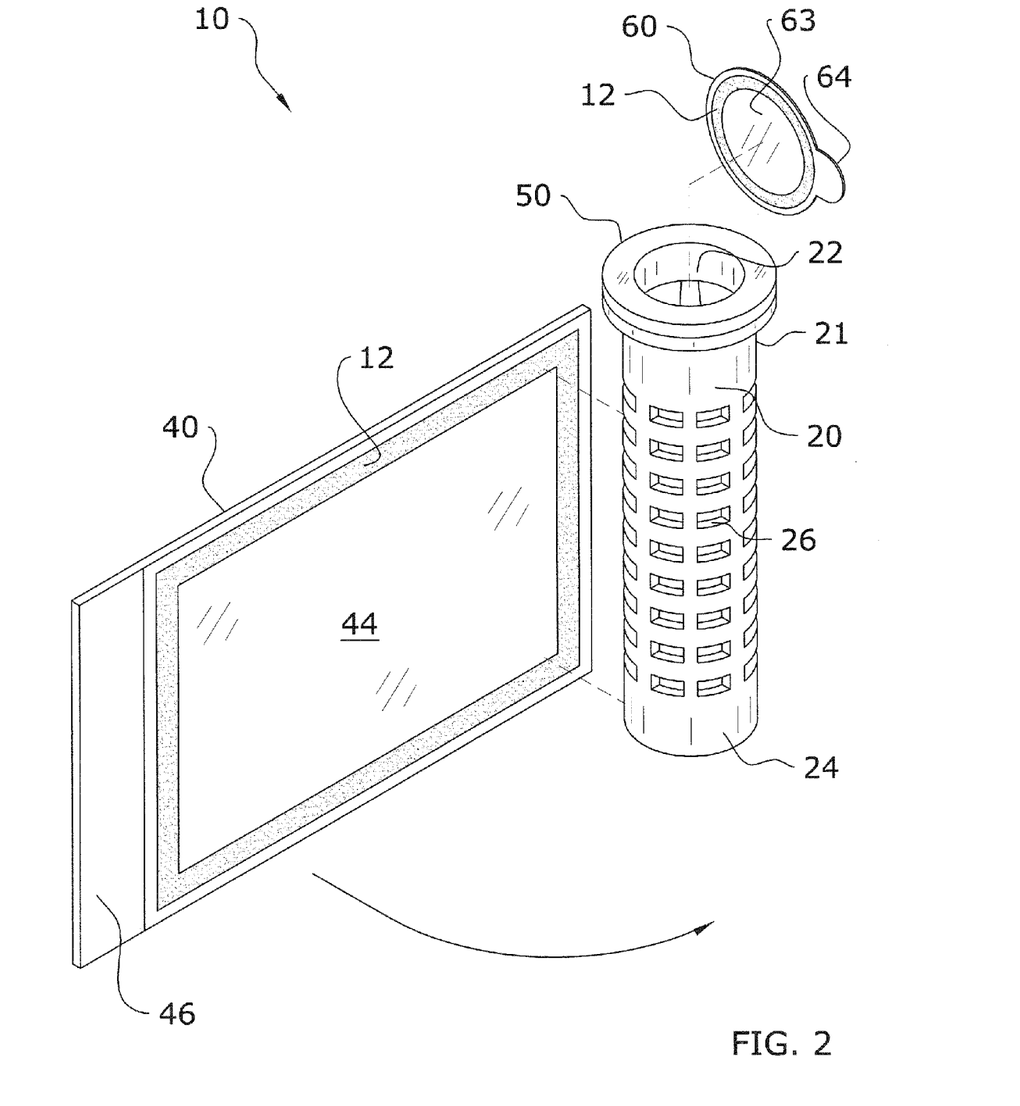
FIG. 2 is an upper perspective view of the present invention illustrating positioning of the outer film and cap.

The capsule 20 will generally include a plurality of apertures 26 surrounding its outer surface as shown in FIG. 2. The apertures 26 will be utilized as a passageway through which the anchoring substance 30 of the present invention will be excreted upon insertion of a fastener 15 into the cavity 25 of the capsule 20. Preferably, the apertures 26 will substantially cover the outer body of the capsule 20 in a manner similar to a screen or mesh.

While the figures illustrate apertures 26 comprised of a rectangular shape, it is appreciated that any shape may be utilized for the apertures 26 without affecting the overall operation of the present invention. Further, the number and spacing of apertures 26 present on the outer surface of the capsule 20 should not be construed as being limited to the arrangement shown in the figures. Preferably, however, the apertures 26 will extend completely around the body of the capsule 20 so as to allow even distribution of the excreted anchoring substance 30 in a manner which completely surrounds the capsule 20.

C. Anchoring Substance

The present invention will generally utilize an anchoring substance 30 to secure the capsule 20 within a borehole 14 of a wall 13. The anchoring substance 30 will generally be positioned within the cavity 25 of the capsule 20 such that, upon introduction of a fastener 15 or other items within the cavity 25, the anchoring substance 30 will be excreted out of the capsule 20 through its plurality of apertures 26.

The anchoring substance 30 of the present invention will generally be comprised of a substance or material which hardens with exposure to humidity or air. The anchoring substance 30 may be comprised of various types of materials, including moisture-curing polyurethane, moisture-curing urethane, epoxy monocomponent resin, silicone adhesives, acrylic adhesives, methacrylate adhesives, cyanoacrylate adhesives and sikyl terminated modified polymers. In a preferred embodiment, the anchoring substance 30 will be comprised of mono-component anchoring substance 30 such as an adhesive comprised of a moisture-curing polyurethane.

It should be appreciated that various other types of anchoring substances 30 may be utilized with the present invention without affecting its overall operation so long as the substance 30 is capable of being excreted through the apertures 26 of the capsule 20 and provides the requisite adhesiveness for securing the capsule 20 within the borehole 14 of a wall 13 or other structure. Further, the anchoring substance 30 may be comprised of a substantially solid substance as shown in the figures or a more liquid substance. It should be appreciated that the viscosity of the anchoring substance 30 may vary so long as it may be excreted through the apertures 26 upon introduction of an object within the cavity 25 of the capsule 20.

D. Sleeve

As shown in FIG. 2, a sleeve 40 may be utilized to cover the outer surface of the capsule 20 to prevent premature hardening of the anchoring substance 30 stored within its cavity 25. The sleeve 40 may be comprised of various types of materials, but will generally be comprised of plastic, aluminum, paper or the like. It is appreciated that the sleeve 40 may be comprised of any material which is capable of wrapping around the body of the capsule 20 in a manner which both covers the apertures 26 to prevent premature hardening of the anchoring substance 30 and allows for removal of the sleeve 40 when using the present invention.

The sleeve 40 will generally include an outer surface 42 and an inner surface 44. Generally, the inner surface 44 of the sleeve 40 will be removably attached to the outer surface of the capsule 20 in a manner which covers all of its apertures 26. The sleeve 40 may be removably attached to the outer surface of the capsule 20 through various means, including the use of an adhesive 12 along the outer perimeter of the inner surface 44 of the sleeve 40 as shown in FIG. 2. The sleeve 40 may include a gripping member 46 as shown in FIG. 1 to ease removal of the sleeve 40 from the capsule 20.

In embodiments in which adhesive 12 is utilized, it should be appreciated that the positioning and arrangement of the adhesive 12 should not be construed as limited to the arrangement shown in FIG. 2. Various arrangements and positioning may be utilized so long as a secure, removably connection is achieved between the sleeve 40 and capsule 20. For example, thermoplastic welding may be utilized to removably attach the sleeve 40 to the capsule 20 in some embodiments.

It should also be appreciated that any number of materials and/or methods may be utilized to removably attach the sleeve 40 to the capsule 20 so long as the sleeve 40 is easily removable therefrom and is secured in a manner so as to prevent premature hardening of the anchoring substance 30.

E. Guide Member

Figure 8:
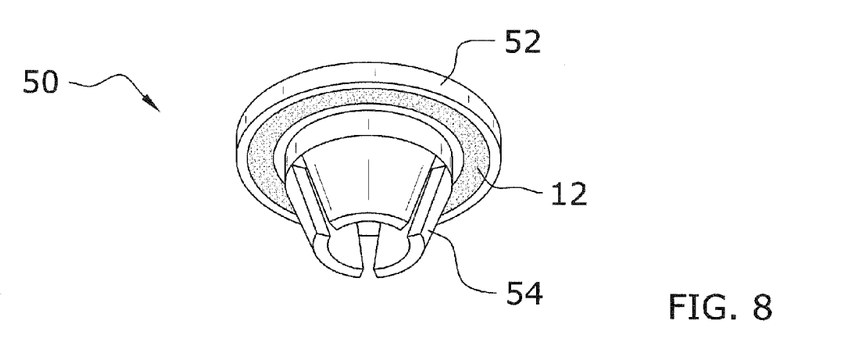
FIG. 8 is an upper perspective view of a guide member of the present invention.
Figure 9:
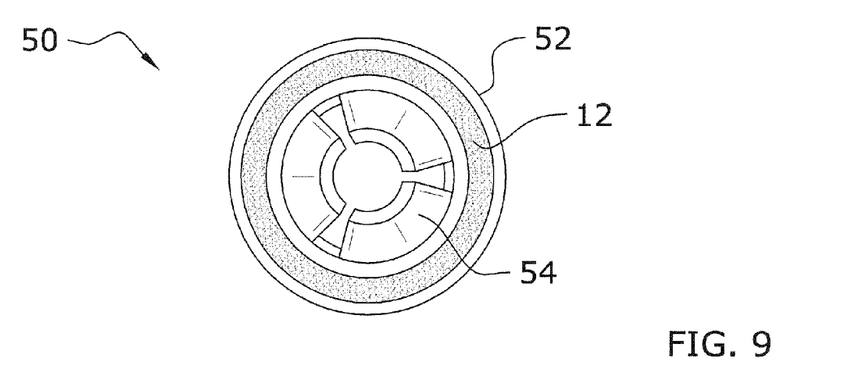
FIG. 9 is a bottom view of a guide member of the present invention.
Figure 10:
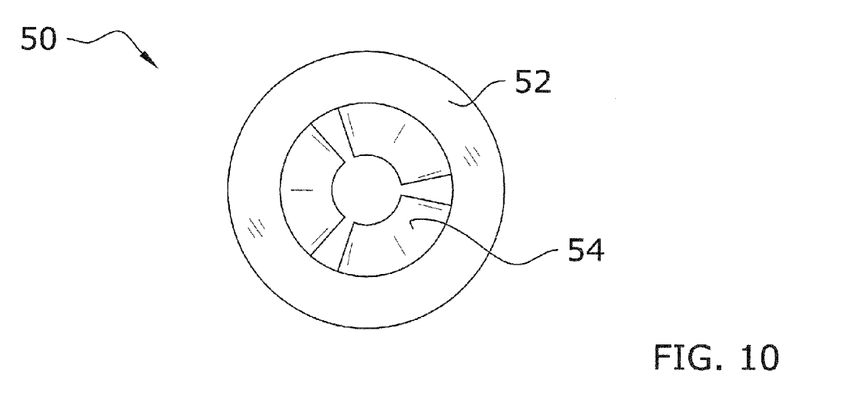
FIG. 10 is a top view of a guide member of the present invention.

The present invention may also include a guide member 50 for centering and guiding a fastener 15 as it is being inserted into the cavity 25 of the capsule 20. The guide member 50 may be comprised of various configurations, but will preferably be comprised of a flange 52 from which a plurality of radially downward facing projections 54 extend as shown in FIGS. 8, 9 and 10. The projections 54 will preferably be arranged so as to create a funneling structure to center and guide the fastener 15 into the cavity 25. It should be appreciated, however, that various other structures may be utilized for the guide member 50 so long as it adequately guides and centers an inserted fastener.

Figure 3:
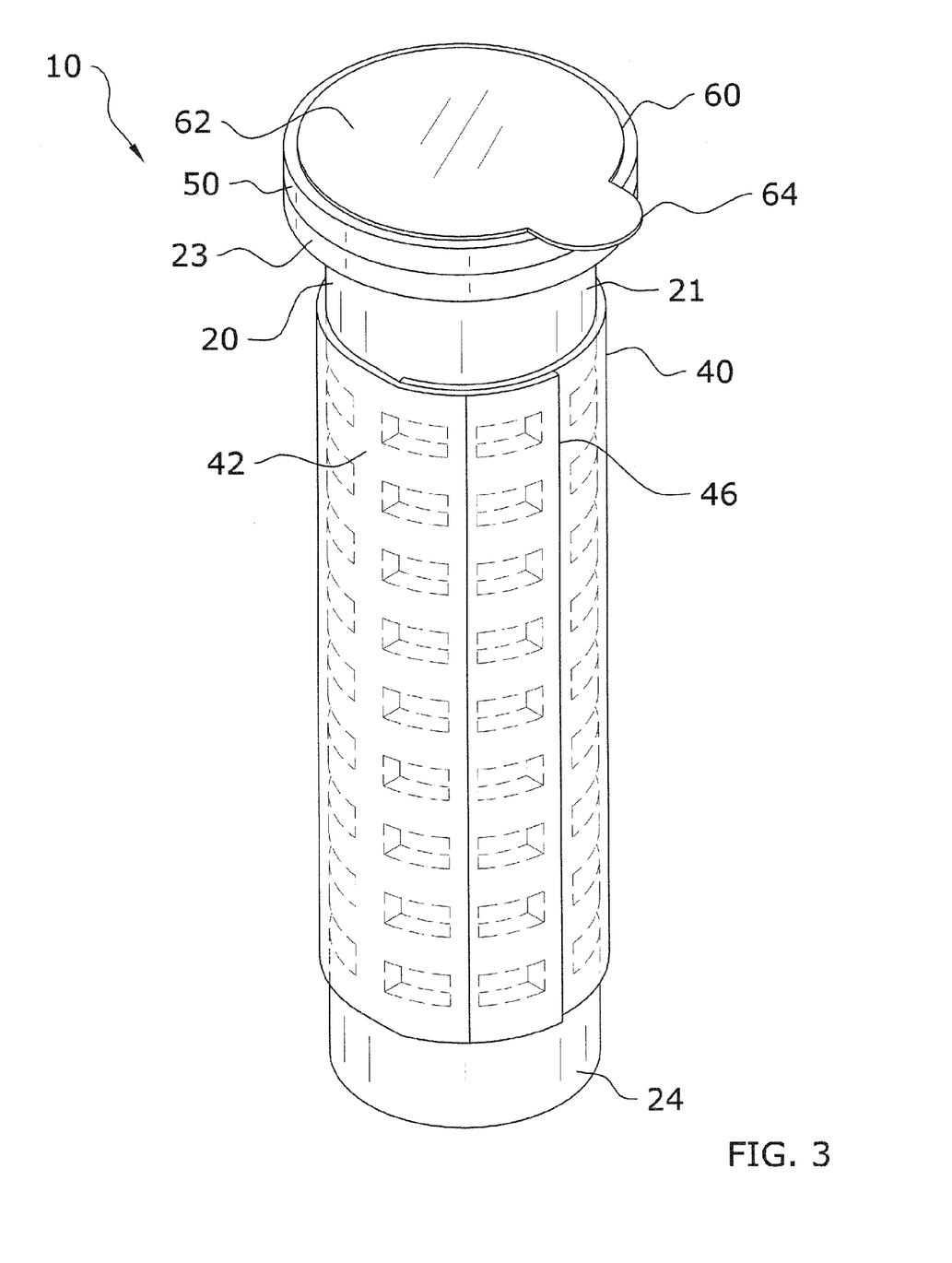
FIG. 3 is an upper perspective view of the present invention.
Figure 4:
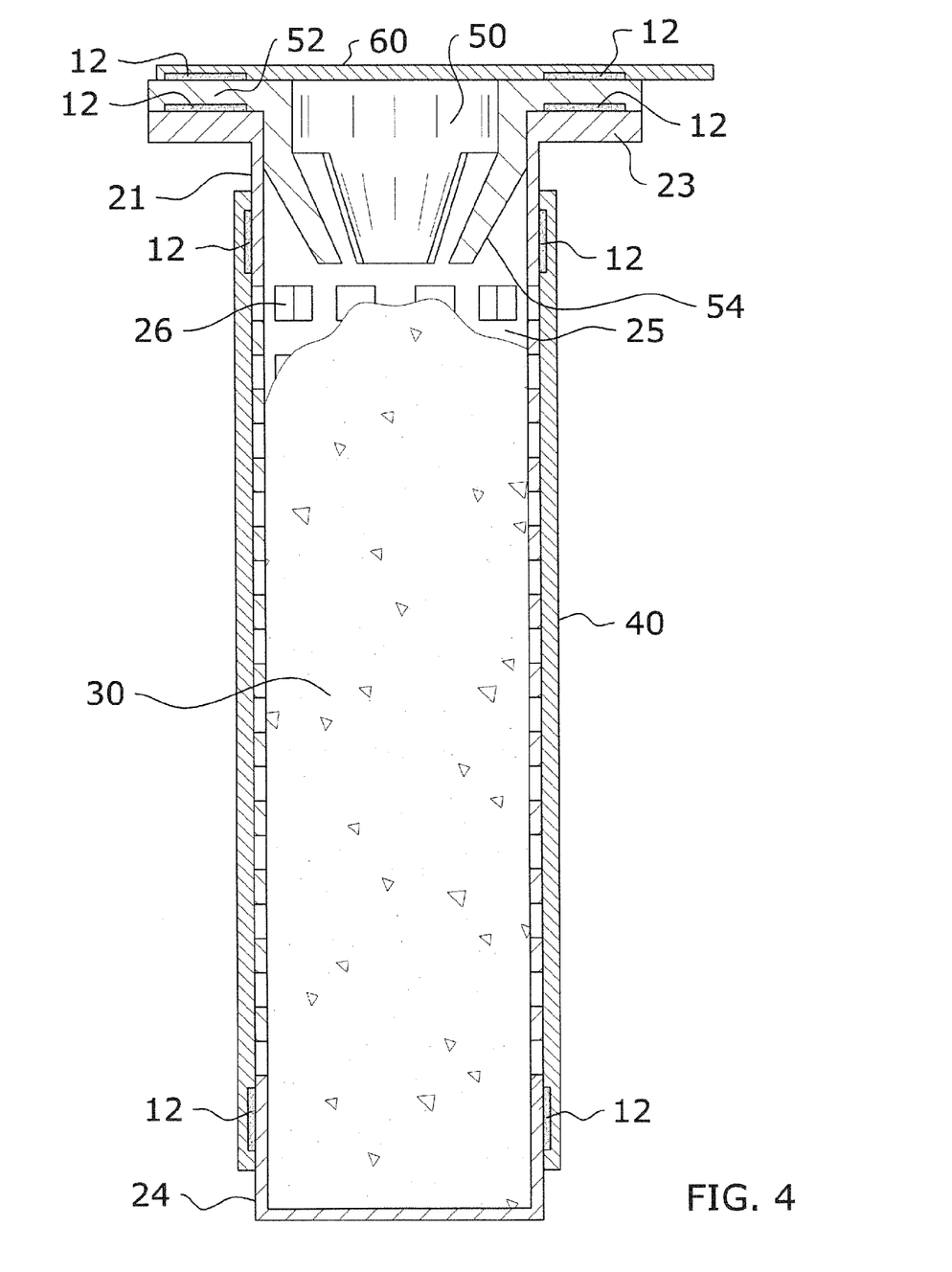
FIG. 4 is a side sectional view of the present invention.

The guide member 50 will generally be positioned directly on top of the flange 23 of the capsule 20 such that the flange 52 of the guide member 50 rests directly on top of the flange 23 of the capsule 20 as shown in FIGS. 3 and 4. As shown in FIGS. 4, 8 and 9, adhesive 12 may be utilized along the underside of the flange 52 of the guide member 50 to secure it onto the top of the capsule 20. When installed properly, the projections 54 of the guide member 50 will extend into the opening 22 of the capsule as shown in FIG. 4.

F. Cap

The present invention will generally include a cap 60 to cover the opening 22 of the capsule 20 and prevent premature hardening of the anchoring substance 30 as shown in FIG. 3. The cap 60 may be comprised of various shapes, sizes and materials so long as it fully encapsulates the opening 22 of the capsule 20 and is removable when needed. For example and without limitation, the cap 60 may be comprised of such materials as plastics, papers, metals, metal alloys and the like. The cap 60 will generally rest directly on top of the guide member 50 when in place.

The cap 60 will include an outer surface 62 which faces away from the capsule 20 and an inner surface 63 which faces toward the cavity 25 of the capsule 20. The cap 60 will generally be removably attached to the capsule 20 through use of adhesive 12 as shown in FIG. 4. However, it is appreciated that various other materials or methods may be utilized for securing the cap 60 so long as it is airtight to prevent premature hardening of the anchoring substance 30 and is easily removably for use. For example, thermoplastic welding may be utilized to removably attach the cap 60 to the capsule 20 in some embodiments. The cap 60 may also include a gripping member 64 comprised of a tab or other structure to ease removal of the cap 60 as shown in FIG. 3.

G. Operation of Preferred Embodiment

Figure 5:
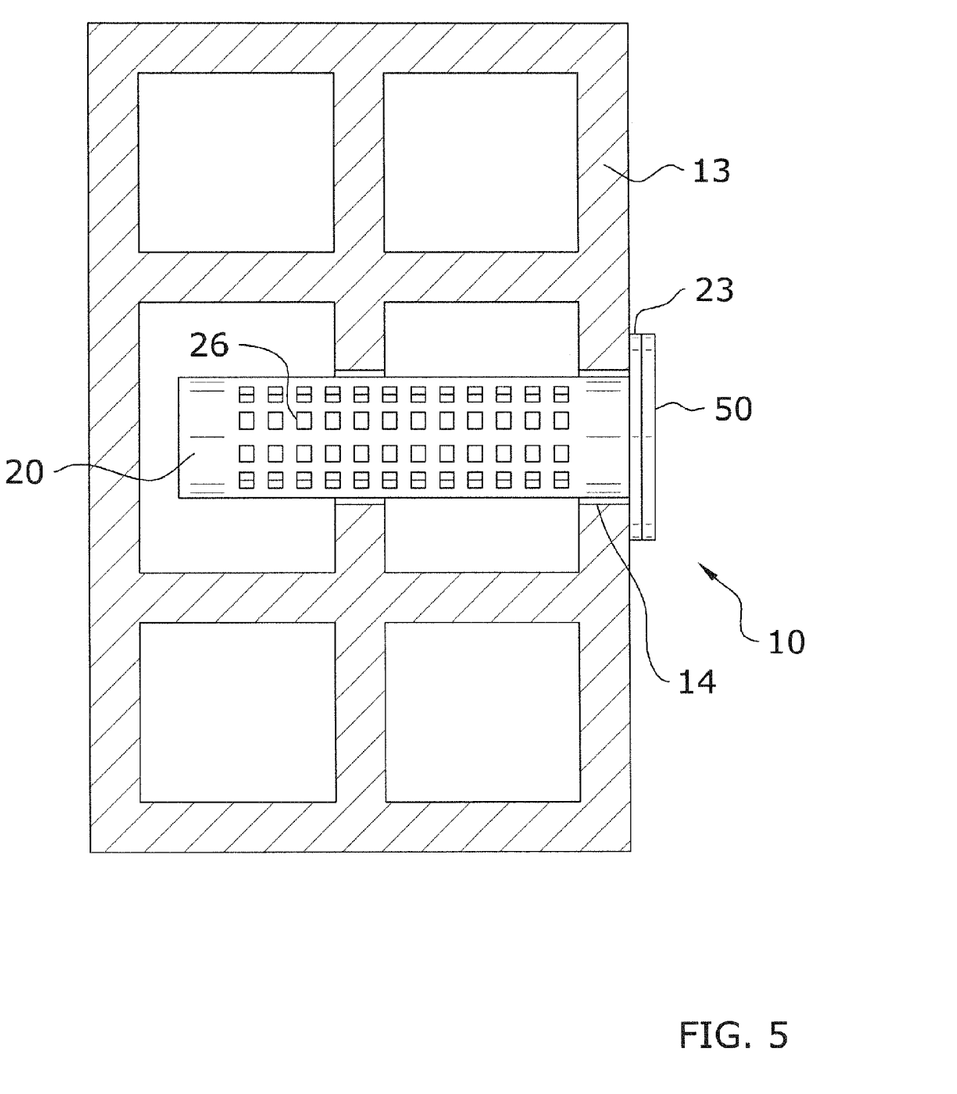
FIG. 5 is a side view of the present invention positioned within a bore hole of a wall.

In use, a borehole 14 is first drilled into a wall 13 or other structure. The outer sleeve 40 and cap 60 will be removed from the capsule 20 and then the capsule 20 will be inserted into the borehole 14 as shown in FIG. 5. After positioning the capsule 20 within the borehole 14, a fastener 15 such as a bolt may be inserted through the opening 22 of the capsule 20 and into the cavity 25. The fastener 15 will be centered and guided into the cavity 25 by the projections 54 of the guide member 50.

Figure 6:
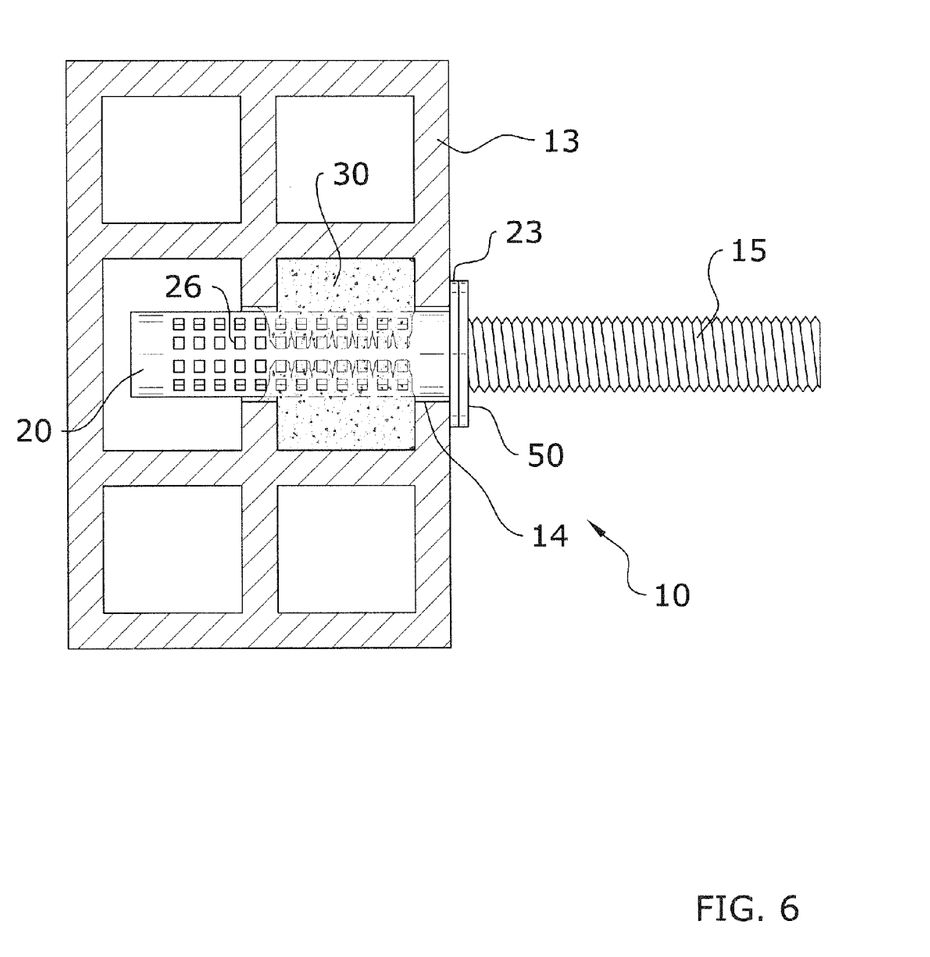
FIG. 6 is a side view of the present invention illustrating insertion of a bolt into the capsule.

As the fastener 15 is inserted into the cavity 25 of the capsule 20, the anchoring substance 30 will be pushed out through the apertures 26 of the capsule 20 as shown in FIG. 6. The anchoring substance 30 will harden and secure both the capsule 20 within the borehole 14 and the fastener 15 within the capsule 20.

Figure 7:
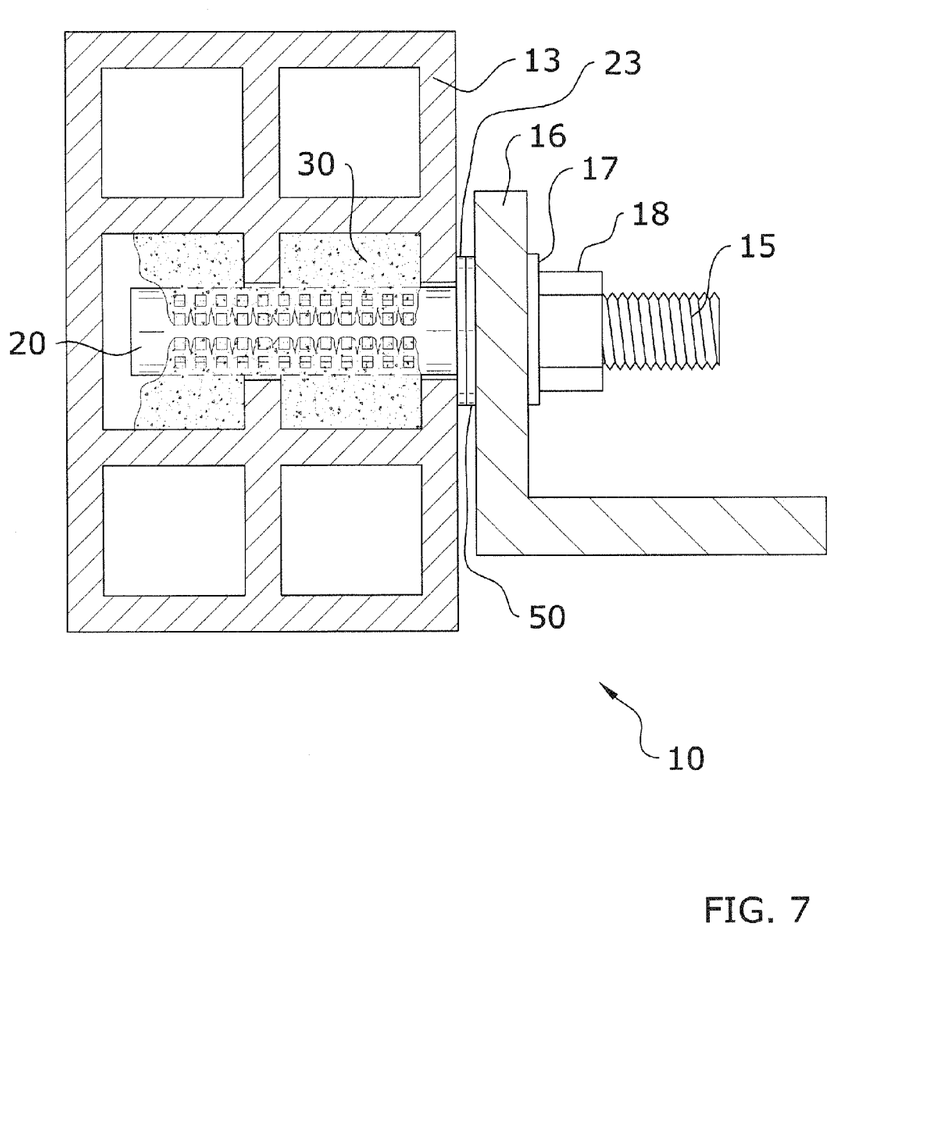
FIG. 7 is a side view of the present invention illustrating the attachment of a load to an anchored bolt.

After the fastener 15 is secured within the cavity 25 of the capsule 20, a load 16 such as a screw, bracket or other structure may be attached to the end of the fastener 15 which extends out of the borehole 14 as shown in FIG. 7. A washer 17 and nut 18 may then be inserted onto the fastener 15 to secure the load 16 to the wall 13 or other structure.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An anchor bolt installation system, comprising:
   a capsule including an open first end, a closed second end and a cavity extending from said first end to said second end, wherein said capsule includes a plurality of apertures positioned along its outer surface;
   an anchoring substance positioned within said cavity of said capsule;
   a sleeve removably secured around said capsule in a manner which covers said plurality of apertures, wherein said sleeve is secured to said capsule by an adhesive; and
   a cap positioned over said open first end of said capsule.

2. The anchor bolt installation system of claim 1, wherein said capsule is hollow and cylindrical.

3. The anchor bolt installation system of claim 1, further comprising a guide member positioned over said open first end of said capsule.

4. The anchor bolt installation system of claim 3, wherein said cap is positioned directly on top of said guide member.

5. The anchor bolt installation system of claim 4, wherein said guide member includes a flange and a plurality of projections.

6. The anchor bolt installation system of claim 1, wherein said capsule includes a flange.

7. The anchor bolt installation system of claim 1, wherein said anchoring substance is comprised of a monocomponent anchoring substance.

8. An anchor bolt installation system, comprising:
   a capsule including an open first end, a closed second end and a cavity extending from said first end to said second end, wherein said capsule includes a plurality of apertures positioned along its outer surface, wherein said capsule is hollow and cylindrical, wherein said first end of said capsule includes a flange;
   an anchoring substance positioned within said cavity of said capsule;
   a sleeve removably secured around said capsule in a manner which covers said plurality of apertures, wherein said sleeve is secured to said capsule by an adhesive, wherein said sleeve includes a gripping member;
   a guide member positioned over said open first end of said capsule, wherein said guide member includes a flange and a plurality of projections; and
   a cap positioned over said guide member, wherein said cap is secured to said capsule by an adhesive, wherein said cap includes a gripping member.

9. An anchor bolt installation system, comprising:
a capsule including an open first end, a closed second end and a cavity extending from said first end to said second end, wherein said capsule includes a plurality of apertures positioned along its outer surface;
an anchoring substance positioned within said cavity of said capsule;
a sleeve removably secured around said capsule in a manner which covers said plurality of apertures, wherein said sleeve is secured to said capsule by thermoplastic welding; and
a cap positioned over said open first end of said capsule.

\* \* \* \* \*